(12) United States Patent
Kozak (10) Patent No.: US 12,038,117 B2
(45) Date of Patent: Jul. 16, 2024

(54) CLOSURE FOR VESSEL OR PIPELINE

(71) Applicant: IN-LINE FLOW PRODUCTS LTD., Edmonton (CA)

(72) Inventor: Keith Alan Kozak, Sherwood Park (CA)

(73) Assignee: IN-LINE FLOW PRODUCTS LTD., Edmonton (CA)

( * ) Notice: Subject to any disclaimer, the term of this patent is extended or adjusted under 35 U.S.C. 154(b) by 377 days.

(21) Appl. No.: 17/484,991

(22) Filed: Sep. 24, 2021

(65) Prior Publication Data

US 2023/0102384 A1 Mar. 30, 2023

(51) Int. Cl.
*F16L 55/115* (2006.01)
*F16J 13/20* (2006.01)
*F17C 13/06* (2006.01)

(52) U.S. Cl.
CPC ........... *F16L 55/1152* (2013.01); *F16J 13/20* (2013.01); *F17C 13/06* (2013.01); *F17C 2205/0311* (2013.01)

(58) Field of Classification Search
CPC . B01J 3/03; B63B 43/32; B65D 55/16; B65D 90/10; B65D 91/10; B66C 23/208; E05D 7/06; E05D 7/14; E05D 15/04; E05D 15/28; E05D 2015/487; E05D 15/56; E05D 2700/12; E06B 3/50; E06B 3/5009; E06B 3/509; F16J 13/00; F16J 13/02; F16J 13/04; F16J 13/12; F16J 13/16; F16J 13/18; F16J 13/20; F16J 13/22; F16J 13/24; F16L 55/1018; F16L 55/115; F16L 55/1152; F16L 55/1155; F16L 55/46

USPC .... 49/153, 254, 258, 259, 405, 455; 109/71, 109/72; 138/89; 220/263, 290, 291, 327, 220/813, 817, 818, 819, 832, 845; 248/213.1, 274.1, 278.1, 282.1, 283.1, 248/285.1, 324, 326, 916
See application file for complete search history.

(56) References Cited

U.S. PATENT DOCUMENTS

| | | | | |
|---|---|---|---|---|
| 1,502,996 A | * | 7/1924 | Loetscher | F01P 11/0214 220/291 |
| 1,973,228 A | * | 9/1934 | Schott | F16J 13/20 220/314 |
| 2,435,913 A | * | 2/1948 | Wall | F16J 13/12 220/291 |
| 2,476,239 A | * | 7/1949 | Duncan | G01B 5/0004 33/832 |

(Continued)

FOREIGN PATENT DOCUMENTS

| | | |
|---|---|---|
| DE | 102008011462 | 9/2009 |
| DE | 102012204711 | 9/2013 |

*Primary Examiner* — Robert K Arundale
*Assistant Examiner* — Richard K. Durden
(74) *Attorney, Agent, or Firm* — FOLEY & LARDNER LLP (57) ABSTRACT

An improved closure assembly for a pressure vessel or pipeline is described, where the closure assembly includes a davit assembly pivotally connecting a closure door to a closure hub where the closure door threadably attaches to the closure hub. The closure door is also threadably attached to the davit assembly where the threaded attachment between with the davit assembly is synchronized or timed with the threaded attachment between the closure door and the closure hub.

20 Claims, 8 Drawing Sheets

(56) References Cited

U.S. PATENT DOCUMENTS

| | | | | |
|---|---|---|---|---|
| 2,870,934 | A * | 1/1959 | Hill | F16L 55/1286 |
| | | | | 220/816 |
| 3,266,077 | A * | 8/1966 | Elliott | F16L 55/46 |
| | | | | 15/104.062 |
| 3,376,007 | A * | 4/1968 | Chesterley | A47F 7/0042 |
| | | | | 248/487 |
| 4,279,356 | A * | 7/1981 | Amorese | F16J 13/20 |
| | | | | 220/314 |
| 4,351,079 | A * | 9/1982 | Fitzpatrick | F16L 55/46 |
| | | | | 15/104.062 |
| 4,515,287 | A | 5/1985 | Baudoux et al. | |
| 4,519,519 | A * | 5/1985 | Meuschke | G21F 7/005 |
| | | | | 220/291 |
| 4,658,529 | A | 4/1987 | Bertolini | |
| 5,318,509 | A | 6/1994 | Agbodoe | |
| 6,663,149 | B1 * | 12/2003 | White | F16J 13/12 |
| | | | | 292/256.73 |
| 6,685,380 | B2 * | 2/2004 | White | F16J 13/12 |
| | | | | 220/284 |
| 6,857,536 | B2 * | 2/2005 | Smith | G01M 17/007 |
| | | | | 220/293 |
| 7,210,201 | B2 | 5/2007 | Maeckle et al. | |
| 7,213,848 | B2 | 5/2007 | Hagan | |
| 7,326,092 | B2 | 2/2008 | Fedder et al. | |
| 7,850,214 | B2 | 12/2010 | Ambriiz | |
| 8,353,420 | B1 * | 1/2013 | Carlson | F16L 55/1152 |
| | | | | 384/549 |
| 8,402,612 | B2 | 3/2013 | Wein et al. | |
| 8,540,103 | B2 | 9/2013 | Lollis et al. | |
| 8,596,484 | B1 * | 12/2013 | Haibel | F16J 13/10 |
| | | | | 220/323 |
| 8,740,208 | B2 | 6/2014 | Hagan et al. | |
| 8,820,565 | B2 | 9/2014 | Akhund et al. | |
| 8,967,415 | B2 | 3/2015 | Lang et al. | |
| 9,052,049 | B2 * | 6/2015 | Pargmann | F16L 55/46 |
| 9,447,909 | B2 * | 9/2016 | Smith | F16L 15/04 |
| 10,118,745 | B1 * | 11/2018 | Schmidt | B65D 88/00 |
| 2008/0289380 | A1 | 11/2008 | Blattmann | |
| 2011/0068590 | A1 | 3/2011 | Teng | |

\* cited by examiner

PRIOR ART

CLOSURE FOR VESSEL OR PIPELINE

TECHNICAL FIELD

The present disclosure is related to the field of quick opening closures for providing rapid access to, and sealing the end of, a pressure vessel or pipeline, in particular, to threaded-style closures mounted in an inclined position relative to the mating vessel or pipeline providing an improved method for supporting and aligning the closing elements.

BACKGROUND

There have been many variations in the design of quick opening closures over the last many decades. Most provides a means for rapid access to a pressure vessel or pipeline as compared to bolted flange connections. One of the most common orientations for closures is for the center axis bore of the closure to match the horizontal axis of the mating vessel or pipeline. In this orientation, as the closure door is opened, the contents contained within the closure, vessel or pipeline assembly would freely exit through the closure. Unless there exists a means to contain the flowing fluid through barrels or catch basins, the fluid would spill on to the surrounding area, posing a potential environmental risk. One of the methods to contain or reduce spillage is to angle the closure upward so the fluid remains inside the vessel or pipeline and the fluid can be removed by controlled means. With the closure in the inclined position, the action of removing the door becomes problematic in the prior art, as the davit fails to support the weight of the door as the door center of mass translates in the horizontal plane, while simultaneously the door rotation results in translation in the inclined plane.

Figure 1:
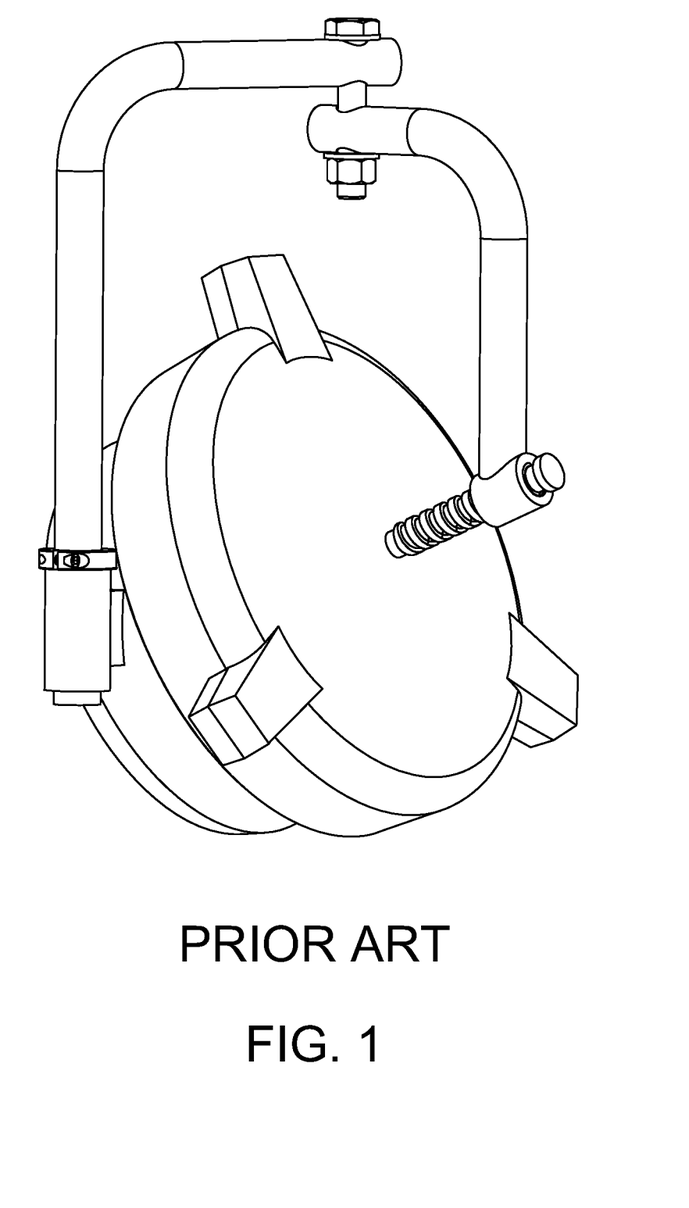
FIG. 1 is a perspective view depicting a prior art closure for a vessel or pipeline.

FIG. 1 shows the existing configuration of a prior art closure design for a vessel or pipeline to be installed in an angled orientation, that is, not horizontal nor vertical, so as to provide an opening to launch or to retrieve a device known as a "pig" passed therethrough, which is used to scrape or clean the inside of the pipeline as well as to perform inspection operations therein as well known to those skilled in the art. The angle of the inclination can be any angle between 1° and 89° from horizontal but is typically between 22.5° and 45° in practice.

The hinge assembly of the prior art design consists of a pair of arms, bent to a 90° angle. One of the arms is attached to the closure hub by means of a hinge. The second arm is attached to a threaded sleeve that, in turn, is threaded on to a center pin attached to the closure cap. The two hinge arms are aligned to allow insertion of a threaded hinge arm pin, the axis of which roughly coincides with the mass center of the closure cap.

As the closure cap is rotated and unthreaded from the closure hub, the threaded cap pin also advances through the threaded sleeve at the same time. The coordination of the threading of the closure cap on the closure hub and the threading of the cap pin in the threaded sleeve is referred to as the "timing" between the two threading operations. As the cap continues to advance off the closure hub, the cap mass center shifts in relation to the threaded pin fastening the two hinge arm. This results in an unbalanced configuration with the shifting mass center of the closure cap causing the hinge arms to twist out of plane in relation to the rotation axis of the closure cap and can then no longer support the full weight of the closure cap over the closure cap center of mass. This results in damage and wear to the threads of the closure cap and hub.

In addition, as the closure cap is advanced off the closure hub, the hinge arm rotates about the hinge arm pin coincidentally as the closure cap pin translates through the threaded sleeve. Depending on resistance to movement between these two simultaneous actions, one may overtake the other, the action with the least resistance being the primary movement. Ideally, both movements must act in unison to support the advancing mass center of the closure cap, however, this never occurs in reality. The threading of the closure cap on the closure hub can become "out of time" with the threading of the cap pin in the threaded sleeve wherein the closure cap cannot be properly threaded onto the closure hub to seal it off when the closure door is being threaded back onto the closure hub. The result is that the timing of the threads of the closure cap hub becomes very difficult and cumbersome to maintain, thereby requiring the operator to calculate the proper timing in order to properly align and thread the closure cap onto the hub.

As the weight of the closure cap can approach 200 pounds (90 kg) or more, it can be physically demanding and difficult to properly align the threads of the closure cap and hub. Misalignment of the cap and hub when threading the two together often occurs, which can cause galling or other damage of the threads until the cap and hub are properly aligned and threaded together.

It is, therefore, desirable to provide an improved davit for a vessel or pipeline closure that overcomes the shortcomings of the prior art.

SUMMARY

An improved closure assembly for a closure for a vessel or pipeline is provided.

Broadly stated, in some embodiments, a closure assembly can be provided for a pressure vessel or pipeline, the closure assembly comprising: a closure hub operatively coupled to the pressure vessel or pipeline, the closure hub configured to provide communication thereto; a closure door configured to threadably couple to the closure hub and seal off communication to the pressure vessel or pipeline; and a davit assembly operatively coupling the closure door to the closure hub, the davit assembly configured to support the closure door when the closure door is threaded off of the closure hub and to move the closure door away from the closure hub to provide access to the pressure vessel or pipeline, the davit assembly further comprising a davit nut threadably coupled to a threaded door pin extending outwardly from the closure door, wherein the door pin threads into or out of the davit nut in synchronization or in time with the closure door when the closure door is threaded off of or on to the closure hub, respectively.

Broadly stated, in some embodiments, an improved closure assembly can be provided for a pressure vessel or pipeline comprising a closure hub operatively coupled to the pressure vessel or pipeline wherein the closure hub is configured to provide communication thereto and a closure door configured to threadably couple to the closure hub and seal off communication to the pressure vessel or pipeline, the improvement comprising: a davit assembly operatively coupling the closure door to the closure hub, the davit assembly configured to support the closure door when the closure door is threaded off of the closure hub and to move the closure door away from the closure hub to provide access to the pressure vessel or pipeline, the davit assembly further comprising a davit nut threadably coupled to a threaded door pin extending outwardly from the closure door, wherein the door pin threads into or out of the davit nut in synchronization or in time with the closure door when the closure door is threaded off of or on to the closure hub, respectively.

Broadly stated, in some embodiments, the davit assembly can comprise: a standoff comprising first and second ends, the first end operatively coupled to the closure hub, the second end extending away from the closure hub, the second end comprising a hinge thereon; a substantially horizontal structural member rotatably coupled to the second end of the standoff and configured to rotate about a substantially vertical axis; and a substantially horizontal radial pin extending away from the substantially horizontal structural member, the radial pin operatively coupled to a davit nut assembly, wherein the davit nut is disposed in the davit nut assembly.

Broadly stated, in some embodiments, the substantially horizontal structural member can comprise a hinge pin rotatably coupled to the hinge.

Broadly stated, in some embodiments, the closure assembly can further comprise a lock collar disposed on the hinge pin, the lock collar configured to provide vertical height adjustment for the davit assembly.

Broadly stated, in some embodiments, the closure assembly can further comprise: a sleeve operatively coupled to the davit nut assembly, the sleeve configured to slidably receive the radial pin; and a horizontal locking mechanism configured to lock the sleeve to the radial pin, the horizontal locking mechanism further configured to provide horizontal movement adjustment and rotational movement adjustment about the radial pin for the davit assembly.

Broadly stated, in some embodiments, the davit nut assembly can comprise: a bracket, wherein the radial pin is operatively coupled to the bracket; a davit nut carrier disposed within the bracket, the davit nut carrier comprising a davit nut recess configured for receiving the davit nut wherein the davit nut can rotate within the davit nut recess; and a davit nut locking mechanism configured to prevent the davit nut from rotating or moving axially within the davit nut carrier.

Broadly stated, in some embodiments, the closure assembly can comprise: a sleeve operatively coupled to the bracket, the sleeve configured to slidably receive the radial pin; and a horizontal locking mechanism configured to lock the sleeve to the radial pin, the horizontal locking mechanism further configured to provide horizontal movement adjustment and rotational movement adjustment about the radial pin for the davit assembly.

Broadly stated, in some embodiments, the davit nut locking mechanism can comprise a set screw configured to thread through the davit nut carrier to tighten against the davit nut.

Broadly stated, in some embodiments, the davit nut carrier can be pivotally attached to the bracket.

Broadly stated, in some embodiments, the closure assembly can comprise a pair of pins configured to pivotally attach the davit nut carrier to the bracket.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

Figure 2:
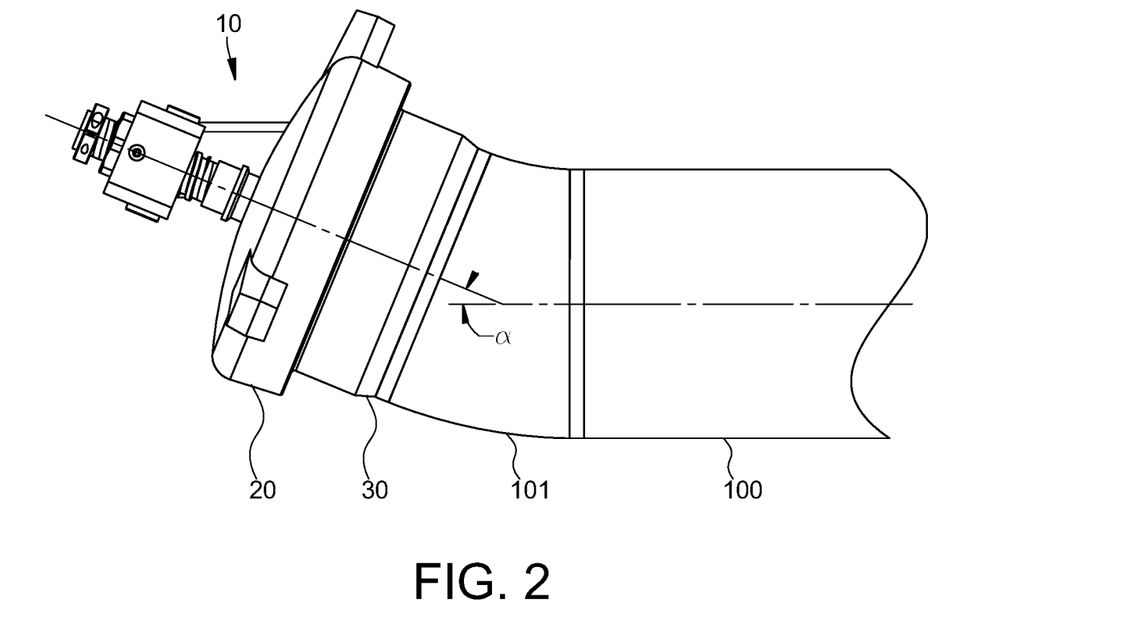
FIG. 2 is a side elevation view depicting one embodiment of an improved closure assembly for a vessel or pipeline.

Referring to FIG. 2, FIG. 2 shows one embodiment of an improved closure assembly for a closure for a vessel or pipeline. In some embodiments, closure assembly (10) can comprise an inclined orientation relative to the horizontal plane or axis of vessel or pipeline (100). For the purposes of this description and the claims that follow, the term "pipeline" as used herein shall be interpreted as referring to a pipeline or to a vessel used for the handling or transportation of fluids or substances therethrough and to any other form or structure used for the handling or transportation of fluids or substances therethrough requiring a closure assembly to provide access thereto or therein.

In some embodiments, the center axis of closure assembly (10) can be offset from the horizontal axis of pipeline (100) by an angle α. The angle α can be any angle from 1 degree to 89 degrees but can be, typically, 22.5 degrees or 45 degrees in representative embodiments. The angle α can be determined by a fitting or elbow member (101) disposed between hub (30) and pipeline (100). Hub (30) can be connected to elbow member (101) by means of welding or through an intermediate flange connection disposed between elbow member (101) and pipeline (100).

In some embodiments, closure assembly (10) can be operatively coupled to, and operated as, a threaded closure for a pressure vessel or pipeline. In some embodiments, closure assembly (10) can comprise hub (30), which can be adapted with an appropriately sized bevel (34) located on the posterior portion of hub (30), to be attached to fitting (101) by welding that, in turn, can be attached to the termination of a vessel or pipeline (100) by welding. Alternatively, closure assembly (10) can comprise of hub (30) that can be adapted with an appropriately sized bevel (34) located on the posterior portion of hub (30) to be attached by welding to fitting (101) that can be attached by welding to a flange (not shown) that can be, in turn, adapted to be attached by bolting (not shown) to an opposing flange (not shown) disposed on pipeline (100) as a termination thereto, as well known to those skilled in the art.

Figure 5:
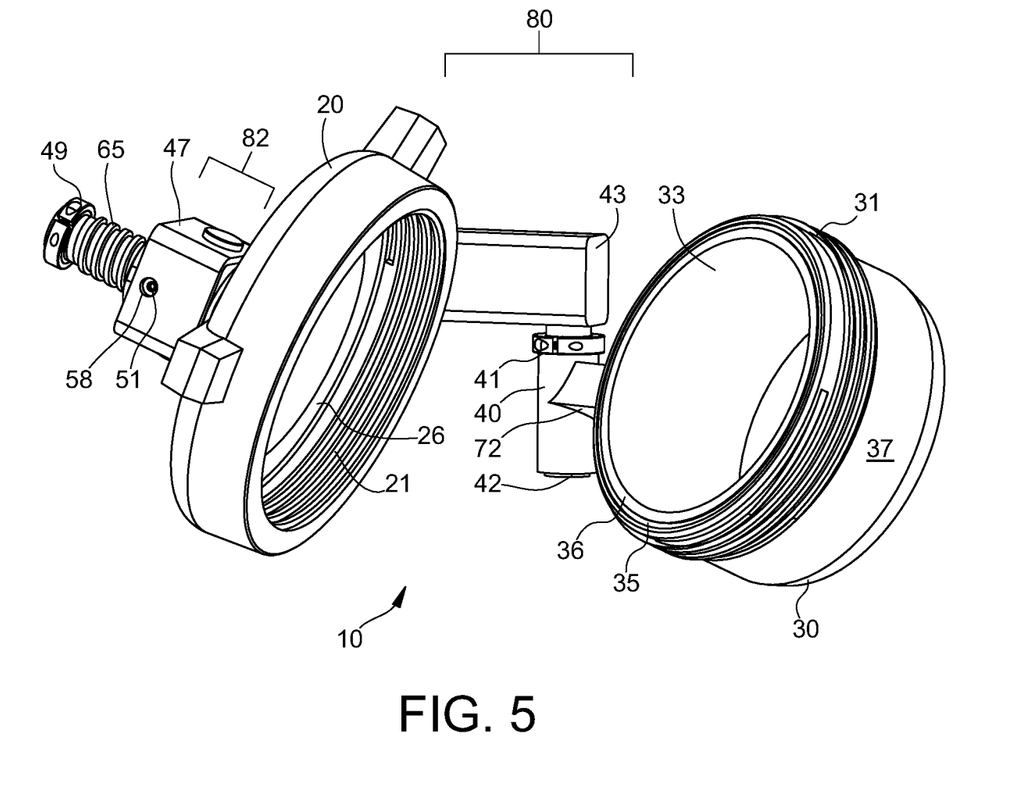
FIG. 5 is a front perspective view depicting the closure assembly of FIG. 4 with the closure door in an open position.

In some embodiments, hub (30) can comprise circular bore (33), as shown in FIG. 5, that can define the central axis of closure assembly (10). The axis of closure assembly (10) can be offset from the horizontal axis of pipeline (100) by an angle α, defined by the length of curvature of fitting (101). The value for a can vary between 1 and 89 degrees relative to the horizontal axis of central bore of pipeline (100) in the horizontal plane.

Figure 3:
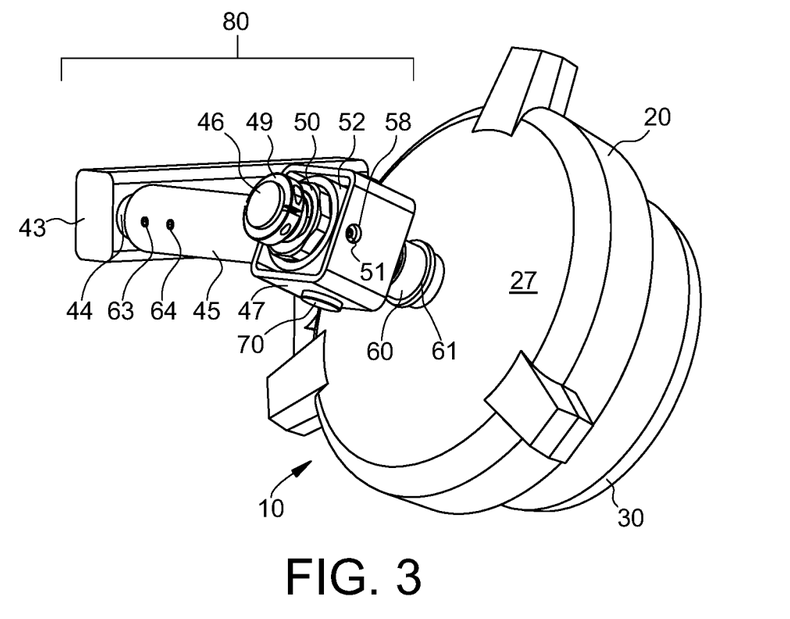
FIG. 3 is a front perspective view depicting the closure assembly of FIG. 2 with a closure door in a closed position.

Referring to FIG. 3, FIG. 3 shows closure assembly (10) in a front perspective view with door (20) in the closed position relative to hub (30).

Figure 4:
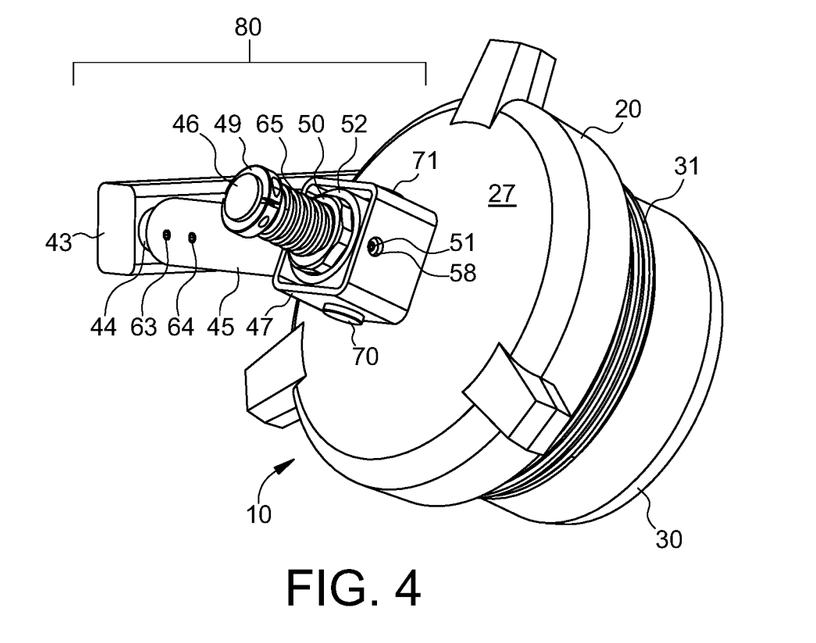
FIG. 4 is a front perspective view depicting the closure assembly of FIG. 3 with the closure door being advanced off of a closure hub.

Referring to FIG. 4, FIG. 4 shows closure assembly (10) in a front perspective view with door (20) advanced off of closure hub threads (31).

Referring to FIG. 5, FIG. 5 shows closure assembly (10) in a front perspective view with door (20) in the open position with door (20) rotated about the axis of hinge (40).

Referring to FIGS. 3, 4 and 5, in some embodiments, door (20) can be attached to hub (30) by means of door internal thread (21) and hub external thread (31). In some embodiments, hub (30) can comprise a groove in hub surface (36) in the anterior end of hub (30) concentric to hub bore (33) that can accept elastomer seal (35). In the closed orientation, inner door surface (26) can come into contact with hub surface (36) and, simultaneously, elastomer seal (35) to form a pressure tight seal. In some embodiments, davit assembly (80) can be attached to hub surface (37) and to the apex of door surface (27) by welding or other mechanical means, wherein davit assembly (80) can provide the means to support door (20) as it is unthreaded from hub (30) and swung away from hub (30) to provide access to bore (33) therein.

Figure 6:
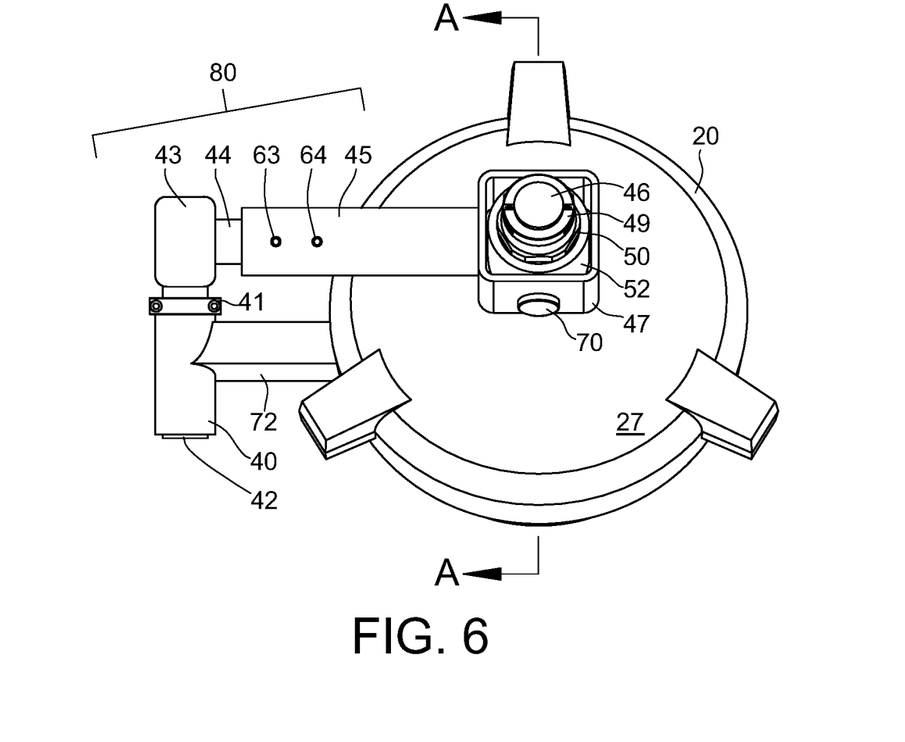
FIG. 6 is a front elevation view depicting the closure assembly of FIG. 3.
Figure 7:
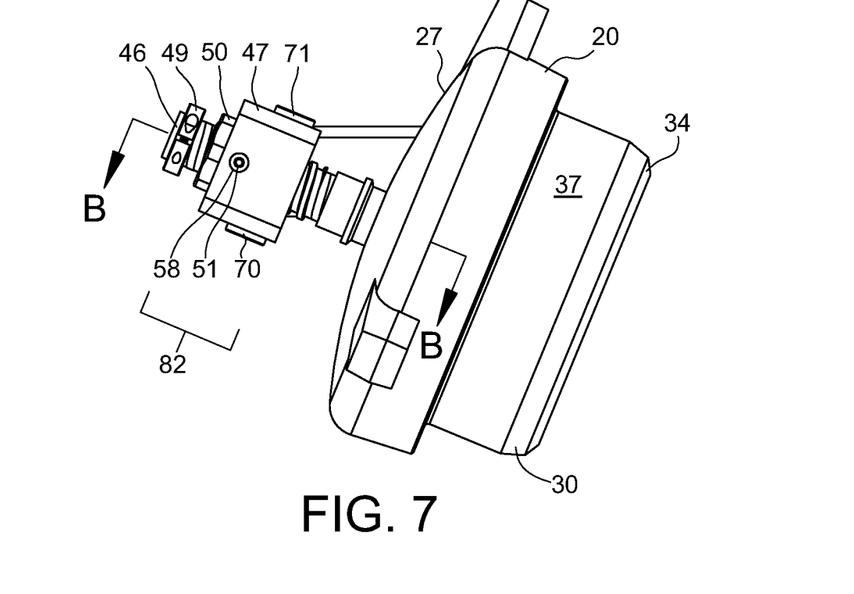
FIG. 7 is a side elevation view depicting the closure assembly of FIG. 6.
Figure 8:
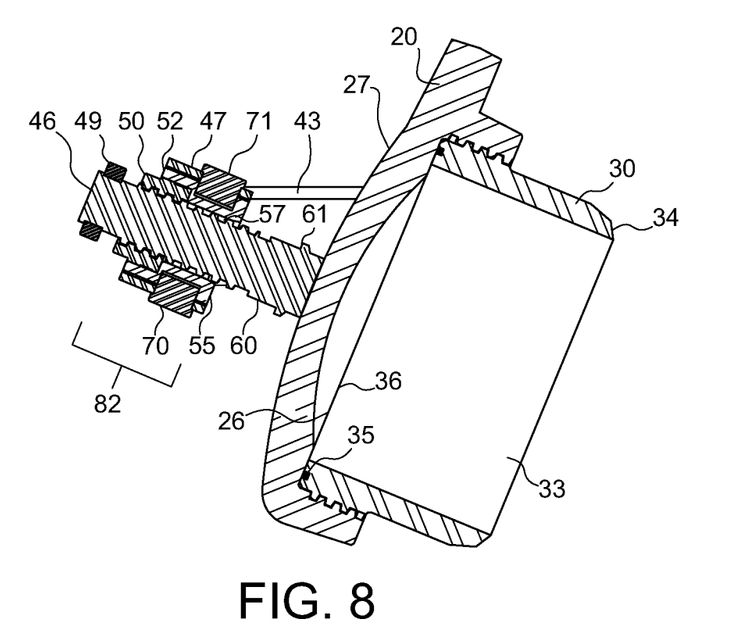
FIG. 8 is a side elevation cross-section view depicting the closure assembly of FIG. 6 along section lines A-A where the closure door is in the closed position.
Figure 9:
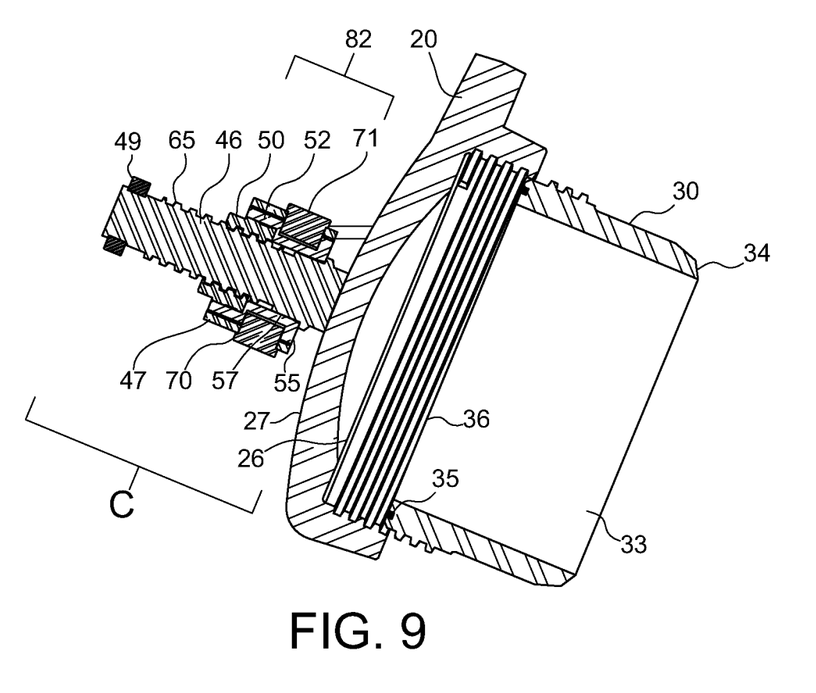
FIG. 9 is a side elevation cross-section view depicting the closure assembly of FIG. 8 where the closure door is advanced off of the closure hub, as shown in FIG. 4.

Referring to FIG. 6, FIG. 6 shows a front elevation view of closure assembly (10) perpendicular to the horizontal axis of pipeline (100). In some embodiments, davit assembly (80) can comprise of sleeve (45), radial pin (44), structural member (43), hinge pin (42), lock collar (41), hinge (40) and standoff (72), with the structural arrangement between these elements described below.

Figure 12:
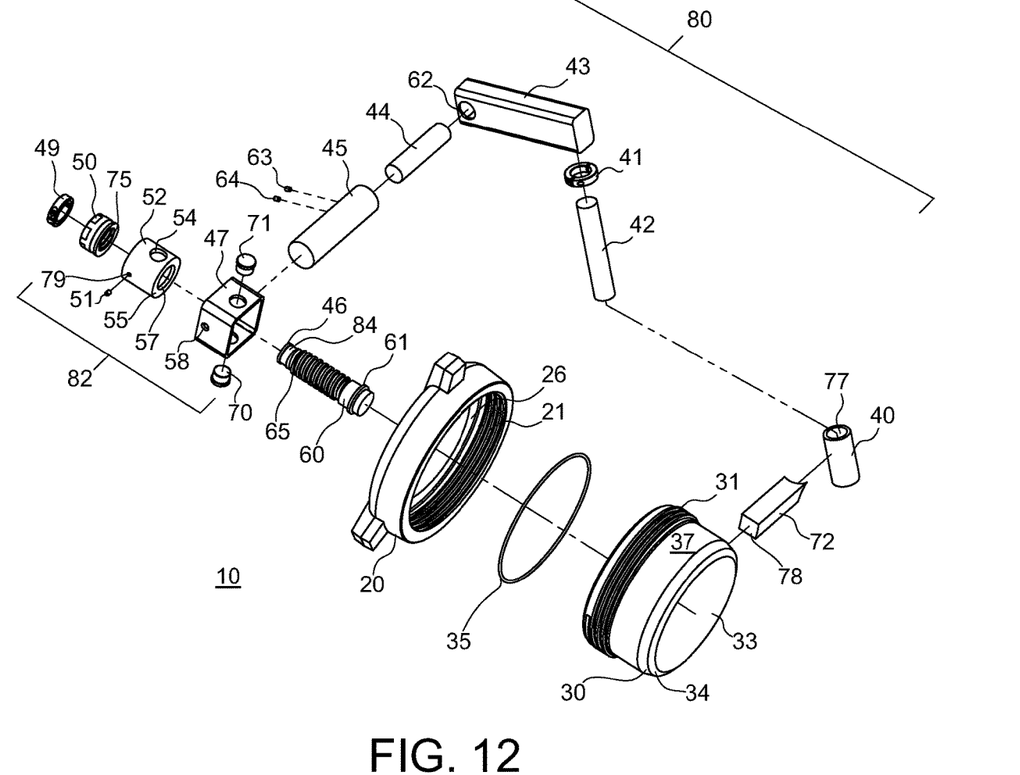
FIG. 12 is an exploded, perspective view depicting the closure assembly of FIG. 3.

As shown in FIGS. 6 and 12, in some embodiments, standoff surface (78) of standoff (72) can be positioned on hub surface (37) to extend radially outward therefrom, with hinge (40) attached to the opposite end of standoff (72). In some embodiments, the orientation of the central axis of hinge (40) can be perpendicular to the central axis of pipeline (100). In some embodiments, hinge pin (42) can be positioned axially within hinge bore (77) with the axial height of hinge pin (42) within hinge (40) maintained by lock collar (41) tightened around hinge pin (42). In other embodiments, the method for maintaining the axial height of the hinge pin (42) within hinge (40) can be set by other means such as locking jam nuts as well known to those skilled in the art.

In some embodiments, the upper end of hinge pin (42) can be attached to the posterior end of structural member (43) by welding or other means whose horizontal plane can be parallel to the horizontal plane of pipeline (100), allowing it to pivot about the vertical axis of hinge pin (42) and hinge (40). In some embodiments, radial pin (44) can be inserted into opening (62) disposed in the anterior end of structural member (43) and attached thereto by welding or other means, wherein radial pin (44) can be parallel to the horizontal plane of pipeline (100). Radial pin (44) can be inserted axially into the opening of the posterior end of sleeve (45), wherein the axial position and the rotational position of sleeve (45) disposed about radial pin (44) can be fixed or set by means of set screws (63) and (64) thus providing horizontal movement adjustment and rotational movement adjustment about radial pin (44) for davit assembly (80). In some embodiments, the anterior end of sleeve (45) can be attached to bracket (47) of davit nut assembly (82) by welding or other means.

In some embodiments, the orientation of bracket (47) can be aligned coincident with the central axis of door (20), wherein the position of door (20) and can be adjusted with davit assembly (80). In some embodiments, the horizontal position of door (20) can be adjusted by means of rotating and sliding sleeve (45) about radial pin (44) and locked into place by tightening set screws (63) and (64). In some embodiments, the vertical position of door (20) can be adjusted by means of sliding hinge pin (42) vertically within bore (77), which can be locked into place with lock collar (41) being tightened around hinge pin (42) such that lock collar (41) rests on top of hinge (40) thus providing vertical height adjustment for davit assembly (80).

Referring to FIGS. 6 to 12, in some embodiments, door pin (46) can be attached to outer surface (27) of door (20) with the central axis of door pin (46) substantially aligned and coincident with the central axis of door (20) and door threads (21). In some embodiments, davit nut (50) can be threaded on to door pin (46) wherein davit nut (50) can be inserted into davit nut carrier (52). In some embodiments, davit nut (50) be disposed in davit nut assembly (82) that can comprise of bracket (47), davit nut carrier (52), pins (70) and (71), davit nut (50) and set screw (51).

In some embodiments, the combination of davit nut (50) and davit nut carrier (52) can be inserted axially into bracket (47) and secured thereto by passing pins (70) and (71) through openings disposed through bracket (47) and into blind holes (54) disposed in davit nut carrier (52) wherein davit nut carrier (52) can rotate within bracket (47) about the axis defined by pins (70) and (71). Pins (70) and (71) can then be secured to bracket (47), such as by welding or other means.

Referring to FIGS. 3, 4 and 5, in some embodiments, rotation of davit nut carrier (52) about the center axis of pins (70) and (71) contained within bracket (47) can allow for correction of parallelism between inner door surface (26) and hub surface (36) in the horizontal plane. Rotation of sleeve (45) about the center axis of radial pin (44) can allow for correction of parallelism between inner door surface (26) and hub surface (36) in the vertical plane. Axial movement of sleeve (45) along radial pin (44) can allow radial alignment of door (20) and hub (30) central axis in the horizontal plane. Rotation of davit pin nut (50) about the axis of door pin (46) can allow for axial correction along door (20) and hub (30) central axis. Axial movement of hinge pin (42) within hinge (40) can allow for alignment of door (20) and hub (30) central axis in the vertical plane.

Figure 10:
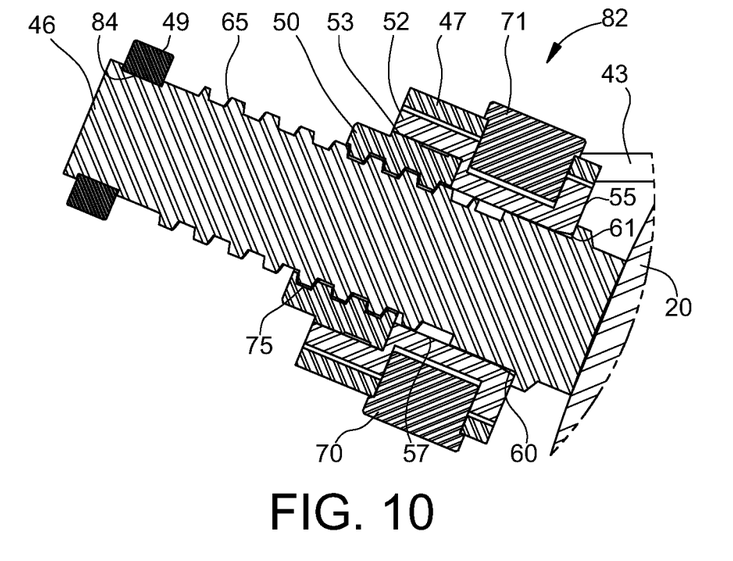
FIG. 10 is a side elevation cross-section view depicting Detail C of FIG. 9.

Referring to FIG. 10, in some embodiments, as door (20) is rotated and advanced off hub (30), door pin (46) can rotate and advance axially through davit nut (50) disposed in davit nut carrier (52). Bracket (47), davit nut carrier (52) and davit nut (50) can remain fixed in response to axial movement of door (20) and door pin (46) by the restraint of davit assembly (80) components sleeve (45), radial pin (44), structural member (43), hinge pin (42) and hinge (40). When door threads (21) completely advance clear of hub threads (31), door pin flange (61) can come into contact with davit nut holder end surface (55) to thereby prevent further advancement of door (20).

In some embodiments, the synchronization or timing between the threading of door (20) onto or off of hub (30) and the threading of door pin (46) within davit nut (50) can be adjusted by rotating davit nut (50) within davit nut recess (53) disposed in davit nut carrier (52). To properly adjust the synchronization or timing, the synchronization or timing of door threads (21) and hub threads (31) can be adjusted by means of fine rotational movement of davit nut (50), such as with a wrench or similar tool, which can move closure door (20) axially relative to closure hub (30). By rotating davit nut (50) in small increments clockwise and/or counterclockwise while simultaneously rotating closure door (20) on hub (30), an optimal position, or "sweet spot", can be found where closure door (20) rotates optimally and freely. When this has been achieved, davit nut (50) can be locked into place within davit nut carrier (52) by tightening set screw (51).

Figure 11:
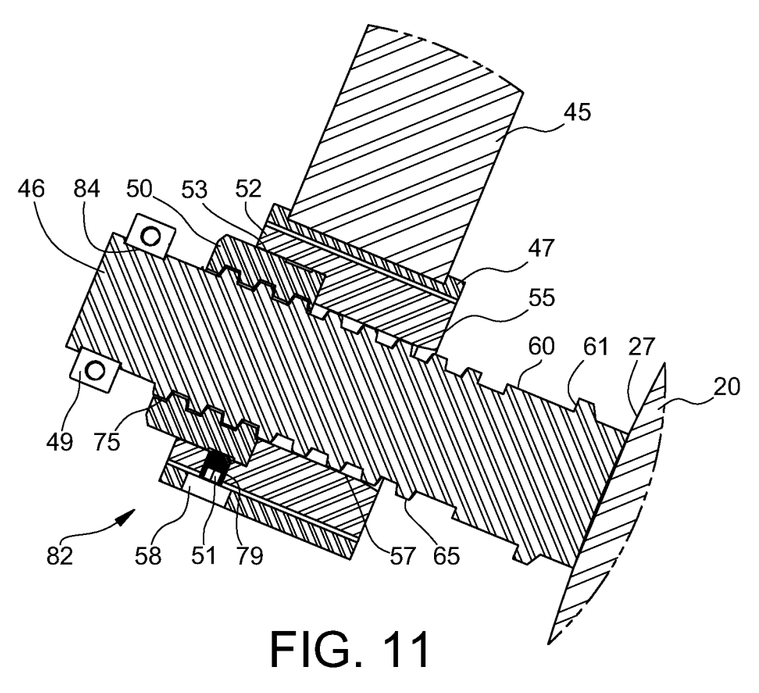
FIG. 11 is a top plan cross-section view depicting the closure assembly of FIG. 7 along section lines B-B.

Once the proper timing adjustment has been achieved, referring to FIG. 11, davit nut (50) can be locked into position in davit nut recess (53) of davit nut carrier (52) with a locking mechanism. In some embodiments, the locking mechanism can comprise of screw (51) inserted through hole (58) into threaded hole (79) disposed within davit nut carrier (52) to tighten against davit nut (50) to lock davit nut (50) within davit nut recess (53) from further rotation or axial movement therein. Once this has been done, the synchronization or timing between threading door (20) off and on hub (30) and threading door pin (46) within davit nut (50) can be maintained thereby permitting door (20) to be threaded off of, and onto, hub (30) repeatedly without any of the problems associated with prior art closure assemblies.

When door (20) is threaded off of hub (30), door pin (46) can thread into davit nut (50) until door pin flange (61) contacts end surface (55). In so doing, door pin shoulder (60) can come into axial engagement with opening (57) disposed within davit nut carrier (52). In some embodiments, the clearance between opening (57) and door pin shoulder (60) can comprise a tight tolerance to prevent door (20) from misalignment as a result of door (20) tilting relative to davit nut carrier (52) due to gravity and to maintain the position and axial alignment of door (20) relative to hub (30) after door (20) has been unthreaded from hub (30) and swung away therefrom by davit assembly (80). In representative embodiments, the clearance between door pin shoulder (60) and opening (57) can range anywhere from 0.005" to 0.025" or more, depending on the size of closure door (20). For example, a 4" diameter closure door (20) can require a smaller diameter door pin (46) than what would be required for a 16" diameter closure door (20) and, thus, the clearance between door pin shoulder (60) and opening (57) can be in the lower end of the clearance range, whereas the clearance between door pin shoulder (60) and opening (57) for the 16" diameter closure door (20) can be in the upper end of the clearance range.

In some embodiments, the clearance between door pin threads (65) and davit nut threads (75) can be greater than the clearance between door pin shoulder (60) and opening (57) to allow ease of threading between door pin threads (65) and davit nut threads (75). In some embodiments, door pin threads (65) can comprise a diameter smaller than the diameter of door pin shoulder (60) thereby allowing door pin threads (65) to pass through opening (57) without obstruction to engage davit nut threads (75). In some embodiments, door pin (46) can comprise lock collar (49) disposed about groove (84) located on a posterior end of door pin (46), as shown in FIGS. 10 and 11, wherein lock collar (49) can prevent the combination of door (20) and door pin (46) from spinning out of davit nut (50) when door (20) is threaded off of hub (30) as lock collar (49) can abut against davit nut (50) in the event that should occur and, thus, prevent door pin (46) from spinning out of davit nut (50) any further.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A closure assembly for a pressure vessel or pipeline, the closure assembly comprising:
   a closure hub operatively coupled to the pressure vessel or pipeline, the closure hub configured to provide communication thereto;
   a closure door configured to threadably couple to the closure hub and seal off communication to the pressure vessel or pipeline; and
   a davit assembly operatively coupling the closure door to the closure hub, the davit assembly configured to support the closure door when the closure door is threaded off of the closure hub and to move the closure door away from the closure hub to provide access to the pressure vessel or pipeline, the davit assembly further comprising a davit nut threadably coupled to a threaded door pin extending outwardly from the closure door, wherein the door pin threads into or out of the davit nut as the closure door is threaded off of or on to the closure hub, respectively, wherein the davit assembly comprises:
      a standoff comprising first and second ends, the first end operatively coupled to the closure hub, the second end extending away from the closure hub, the second end comprising a hinge thereon,
      a substantially horizontal structural member rotatably coupled to the second end of the standoff and configured to rotate about a substantially vertical axis, wherein the substantially horizontal structural member comprises a hinge pin rotatably coupled to the hinge, the closure assembly further comprising a lock collar disposed on the hinge pin, the lock collar configured to provide vertical height adjustment for the davit assembly, and
      a substantially horizontal radial pin extending away from the substantially horizontal structural member, the radial pin operatively coupled to a davit nut assembly, wherein the davit nut is disposed in the davit nut assembly.

2. The closure assembly as set forth in claim 1, further comprising:
   a sleeve operatively coupled to the davit nut assembly, the sleeve configured to slidably receive the radial pin; and
   a horizontal locking mechanism configured to lock the sleeve to the radial pin, the horizontal locking mechanism further configured to provide horizontal movement adjustment and rotational movement adjustment about the radial pin for the davit assembly.

3. The closure assembly as set forth in claim 2, wherein the davit nut assembly comprises:
a bracket, wherein the radial pin is operatively coupled to the bracket;
a davit nut carrier disposed within the bracket, the davit nut carrier comprising a davit nut recess configured for receiving the davit nut wherein the davit nut can rotate within the davit nut recess; and
a davit nut locking mechanism configured to prevent the davit nut from rotating or moving axially within the davit nut carrier when the davit nut locking mechanism is operated to lock the davit nut within the davit nut recess.

4. The closure assembly as set forth in claim 1, wherein the davit nut assembly comprises:
a bracket, wherein the radial pin is operatively coupled to the bracket;
a davit nut carrier disposed within the bracket, the davit nut carrier comprising a davit nut recess configured for receiving the davit nut wherein the davit nut can rotate within the davit nut recess; and
a davit nut locking mechanism configured to prevent the davit nut from rotating or moving axially within the davit nut carrier when the davit nut locking mechanism is operated to lock the davit nut within the davit nut recess.

5. The closure assembly as set forth in claim 4, further comprising:
a sleeve operatively coupled to the bracket, the sleeve configured to slidably receive the radial pin; and
a horizontal locking mechanism configured to lock the sleeve to the radial pin, the horizontal locking mechanism further configured to provide horizontal movement adjustment and rotational movement adjustment about the radial pin for the davit assembly.

6. The closure assembly as set forth in claim 5, wherein the davit nut locking mechanism comprises a set screw configured to thread through the davit nut carrier to tighten against the davit nut.

7. The closure assembly as set forth in claim 5, wherein the davit nut carrier is pivotally attached to the bracket.

8. The closure assembly as set forth in claim 4, wherein the davit nut locking mechanism comprises a set screw configured to thread through the davit nut carrier to tighten against the davit nut.

9. The closure assembly as set forth in claim 4, wherein the davit nut carrier is pivotally attached to the bracket.

10. The closure assembly as set forth in claim 9, further comprising a pair of pins configured to pivotally attach the davit nut carrier to the bracket.

11. An improved closure assembly for a pressure vessel or pipeline comprising a closure hub operatively coupled to the pressure vessel or pipeline wherein the closure hub is configured to provide communication thereto and a closure door configured to threadably couple to the closure hub and seal off communication to the pressure vessel or pipeline, the improvement comprising:
a davit assembly operatively coupling the closure door to the closure hub, the davit assembly configured to support the closure door when the closure door is threaded off of the closure hub and to move the closure door away from the closure hub to provide access to the pressure vessel or pipeline, the davit assembly further comprising a davit nut threadably coupled to a threaded door pin extending outwardly from the closure door, wherein the door pin threads into or out of the davit nut as the closure door is threaded off of or on to the closure hub, respectively, wherein the davit assembly comprises:
a standoff comprising first and second ends, the first end operatively coupled to the closure hub, the second end extending away from the closure hub, the second end comprising a hinge thereon,
a substantially horizontal structural member rotatably coupled to the second end of the standoff and configured to rotate about a substantially vertical axis, wherein the substantially horizontal structural member comprises a hinge pin rotatably coupled to the hinge, the closure assembly further comprising a lock collar disposed on the hinge pin, the lock collar configured to provide vertical height adjustment for the davit assembly, and
a substantially horizontal radial pin extending away from the substantially horizontal structural member, the radial pin operatively coupled to a davit nut assembly, wherein the davit nut is disposed in the davit nut assembly.

12. The improved closure assembly as set forth in claim 11, further comprising:
a sleeve operatively coupled to the davit nut assembly, the sleeve configured to slidably receive the radial pin; and
a horizontal locking mechanism configured to lock the sleeve to the radial pin, the horizontal locking mechanism further configured to provide horizontal movement adjustment and rotational movement adjustment about the radial pin for the davit assembly.

13. The improved closure assembly as set forth in claim 12, wherein the davit nut assembly comprises:
a bracket, wherein the radial pin is operatively coupled to the bracket;
a davit nut carrier disposed within the bracket, the davit nut carrier comprising a davit nut recess configured for receiving the davit nut wherein the davit nut can rotate within the davit nut recess; and
a davit nut locking mechanism configured to prevent the davit nut from rotating or moving axially within the davit nut carrier when the davit nut locking mechanism is operated to lock the davit nut within the davit nut recess.

14. The improved closure assembly as set forth in claim 11, wherein the davit nut assembly comprises:
a bracket, wherein the radial pin is operatively coupled to the bracket;
a davit nut carrier disposed within the bracket, the davit nut carrier comprising a davit nut recess configured for receiving the davit nut wherein the davit nut can rotate within the davit nut recess; and
a davit nut locking mechanism configured to prevent the davit nut from rotating or moving axially within the davit nut carrier when the davit nut locking mechanism is operated to lock the davit nut within the davit nut recess.

15. The improved closure assembly as set forth in claim 14, further comprising:
a sleeve operatively coupled to the bracket, the sleeve configured to slidably receive the radial pin; and
a horizontal locking mechanism configured to lock the sleeve to the radial pin, the horizontal locking mechanism further configured to provide horizontal movement adjustment and rotational movement adjustment about the radial pin for the davit assembly.

16. The improved closure assembly as set forth in claim 15, wherein the davit nut locking mechanism comprises a set screw configured to thread through the davit nut carrier to tighten against the davit nut.

17. The improved closure assembly as set forth in claim 15, wherein the davit nut carrier is pivotally attached to the bracket.

18. The improved closure assembly as set forth in claim 14, wherein the davit nut locking mechanism comprises a set screw configured to thread through the davit nut carrier to tighten against the davit nut.

19. The improved closure assembly as set forth in claim 14, wherein the davit nut carrier is pivotally attached to the bracket.

20. The improved closure assembly as set forth in claim 19, further comprising a pair of pins configured to pivotally attach the davit nut carrier to the bracket.

* * * * *